United States Patent
Zhou et al.

(10) Patent No.: US 10,381,901 B2
(45) Date of Patent: Aug. 13, 2019

(54) WIRELESS IN-WHEEL ELECTRIC ASSEMBLIES WITH INTEGRATED IN-WHEEL COOLING AND VEHICLES INCORPORATING THE SAME

(71) Applicant: Toyota Motor Engineering & Manufacturing North America, Inc., Erlanger, KY (US)

(72) Inventors: Feng Zhou, South Lyon, MI (US); Ercan Mehmet Dede, Ann Arbor, MI (US); Hiroshi N. Ukegawa, Northville, MI (US); Kyosuke Miyagi, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 274 days.

(21) Appl. No.: 15/594,088

(22) Filed: May 12, 2017

(65) Prior Publication Data
US 2018/0331601 A1 Nov. 15, 2018

(51) Int. Cl.
*H02K 9/22* (2006.01)
*B60K 7/00* (2006.01)
(Continued)

(52) U.S. Cl.
CPC .............. *H02K 9/22* (2013.01); *B60K 7/0007* (2013.01); *B60K 11/06* (2013.01); *B60L 50/52* (2019.02);
(Continued)

(58) Field of Classification Search
CPC .. H02K 7/18; H02K 9/06; H02K 9/19; H02K 9/22; H02K 11/33; H02J 50/10;
(Continued)

(56) References Cited

U.S. PATENT DOCUMENTS 5,111,090 A * 5/1992 Otake ...................... H02K 9/19
180/229
5,127,485 A * 7/1992 Wakuta ................ B60K 7/0007
180/65.51
(Continued)

FOREIGN PATENT DOCUMENTS

JP 2002337554 A 11/2002
JP 2016144266 A 8/2016
WO 2013084285 A1 4/2015

*Primary Examiner* — Tran N Nguyen
(74) *Attorney, Agent, or Firm* — Dinsmore & Shohl LLP

(57) ABSTRACT

A wireless in-wheel electric motor assembly having a wheel, an electric motor disposed within the wheel, the electric motor including a stator and a rotor, a receiving coil disposed within the wheel and operable to receive wirelessly transmitted energy, a first converter disposed within the wheel, electrically coupled to the receiving coil and operable to convert the wirelessly transmitted energy from the receiving coil into direct current, an inverter circuit disposed within the wheel, electrically coupled to the conversion circuit and the electric motor, and operable to power the electric motor. The wireless in-wheel electric motor assembly further includes a cooling system disposed within the wheel that includes a micro pump operable to pump coolant, a fluid line operable to pass the coolant proximate at least one of the conversion circuit and the inverter circuit, and a heat exchanger operable to receive heated coolant and dissipate heat to the environment.

20 Claims, 5 Drawing Sheets

(51) Int. Cl.
*H02J 50/10* (2016.01)
*H02P 27/06* (2006.01)
*H02K 11/33* (2016.01)
*H02K 9/06* (2006.01)
*H02K 9/19* (2006.01)
*B60K 11/06* (2006.01)
*H02K 7/18* (2006.01)
*B60L 50/52* (2019.01)

(52) U.S. Cl.
CPC ............ *H02J 50/10* (2016.02); *H02K 7/1846* (2013.01); *H02K 9/06* (2013.01); *H02K 9/19* (2013.01); *H02K 11/33* (2016.01); *H02P 27/06* (2013.01); *B60K 2007/0092* (2013.01); *B60L 2210/30* (2013.01); *B60L 2220/44* (2013.01); *B60L 2240/36* (2013.01); *B60Y 2400/602* (2013.01)

(58) Field of Classification Search
CPC ........... H02P 27/06; B60K 11/06; B60K 1/04; B60K 7/00; B60L 15/00; B60L 50/52; B60L 11/18; B60L 2210/40; B60L 2210/14; F25B 11/02; F25B 5/04; F25B 2600/25; F25B 2400/14; Y10S 903/90; B60Y 2400/11; B60Y 2400/44; B60Y 2306/05

See application file for complete search history.

(56) References Cited

U.S. PATENT DOCUMENTS

| | | | |
|---|---|---|---|
| 5,156,579 A * | 10/1992 | Wakuta | H02K 7/116 475/161 |
| 8,251,167 B2 | 8/2012 | Moriguchi et al. | |
| 8,763,737 B2 * | 7/2014 | Kellogg | B60K 7/0007 180/65.6 |
| 2005/0104470 A1 | 5/2005 | Perkins et al. | |
| 2005/0236198 A1 * | 10/2005 | Jenkins | B60K 7/0007 180/65.51 |
| 2011/0056215 A1 | 3/2011 | Ham et al. | |
| 2014/0232175 A1 * | 8/2014 | Yamamoto | B60K 17/046 301/6.5 |
| 2015/0239527 A1 | 8/2015 | Huang | |

* cited by examiner

WIRELESS IN-WHEEL ELECTRIC ASSEMBLIES WITH INTEGRATED IN-WHEEL COOLING AND VEHICLES INCORPORATING THE SAME

TECHNICAL FIELD

The present specification generally relates to wirelessly powered electric motors for propelling vehicles and, more specifically, to wirelessly powered electric motors incorporating an integrated cooling system.

BACKGROUND

Some vehicles are powered by electric motors. Such motors may convert electrical energy from a battery or other source to mechanical energy to turn one or more wheels. Generally, electric devices used to convert electrical energy to mechanical energy will generate heat and thus may require heat removal components. The electric motor also generates heat. Accordingly, the electronic devices converting the electrical energy and the electric motor itself should be cooled by a cooling system, such as a liquid cooling system, whereby a coolant passes the electric devices and/or the motor to remove thermal energy therefrom.

In many electric vehicles, the electric motor and the drive electronics are disposed under the hood of the electric vehicle, thereby replacing a traditional combustion engine. The location under the hood of the electric vehicle has ample space for a cooling system.

However, in some electric vehicles, the electric motors are positioned within the wheels themselves. Traditional in-wheel electric motors require conductive wires to pass between a body of the vehicle and the in-wheel motor. Additionally, fluid lines may also be required to pass coolant between a heat exchanger in the body of the electric vehicle and the in-wheel motor.

The environment between the body of the electric vehicle and the in-wheel electric motor may be harsh during operation of the vehicle, making the conductive wires and fluid lines susceptible to damage. Wireless in-wheel motors eliminate the need for conductive wires by wirelessly transmitting electrical energy from the body of the vehicle to the in-wheel motor. For example, primary and secondary coils may be used to wirelessly transmit the electrical energy.

However, the drive electronics and the wireless in-wheel motor disposed within the wheel still require cooling and therefore fluid lines in the harsh environment between the body of the electric vehicle and the wireless in-wheel motor. Thus, even though the electrically conductive wires are eliminated by the wireless in-wheel motor, fluid lines are still needed.

Accordingly, alternative wireless in-wheel electric motors are desired.

SUMMARY

In one embodiment, a wireless in-wheel electric motor assembly includes a wheel, an electric motor disposed within the wheel, the electric motor having a stator and a rotor, a receiving coil operable to receive wirelessly transmitted energy. In embodiments, the receiving coil is disposed within the wheel. The assembly further includes a first converter electrically coupled to the receiving coil and operable to convert the wirelessly transmitted energy from the receiving coil into direct current and the converter is disposed within the wheel. The assembly also includes an inverter circuit electrically coupled to the conversion circuit and the electric motor and the inverter is operable to power the electric motor and is disposed within the wheel. The assembly further includes a cooling system disposed within the wheel, the cooling system including a micro pump operable to pump coolant, a fluid line operable to pass the coolant proximate at least one of the conversion circuit and the inverter circuit, and a heat exchanger operable to receive heated coolant and dissipate heat to the environment.

In another embodiment, a vehicle includes one or more batteries, a transmitting coil electrically coupled to the one or more batteries and operable to transmit wirelessly transmitted energy, and a wireless in-wheel electric motor assembly that includes a wheel, an electric motor disposed within the wheel, the electric motor comprising a stator and a rotor, a receiving coil operable to receive wirelessly transmitted energy from the transmitting coil, a first converter electrically coupled to the receiving coil and operable to convert the wirelessly transmitted energy from the receiving coil into direct current, wherein the converter is disposed within the wheel, an inverter circuit electrically coupled to the conversion circuit and the electric motor, wherein the inverter is operable to power the electric motor and is disposed within the wheel, and a cooling system. The cooling system includes a micro pump operable to pump coolant, a fluid line operable to pass the coolant proximate at least one of the conversion circuit and the inverter circuit, and a heat exchanger operable to receive heated coolant and dissipate heat to the environment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to wireless in-wheel electric motor assemblies having an integrated cooling system. Accordingly, the wireless in-wheel electric motor assemblies described herein have a wireless electric motor, heat generating components in the form of drive electronics (e.g., semiconductor devices providing converter and inverter functionalities), and an integrated cooling system all maintained within a wheel. Accordingly, the wireless in-wheel electric motor assemblies described herein remove the need to include both electrically conductive wires and fluid lines between the body of the vehicle and the in-wheel motor. Particularly, electric vehicles including the wireless in-wheel electric motor assemblies described herein may require no electrical connections between the wheel and the vehicle because the wireless energy is transferred across an air gap between the vehicle body and the wheel. Further, because the cooling system is self-contained within the wheel, the coolant only flows within the wheel and is not required to be transferred back and forth between the wireless in-wheel electric motor and the body of the vehicle.

Figure 1B:
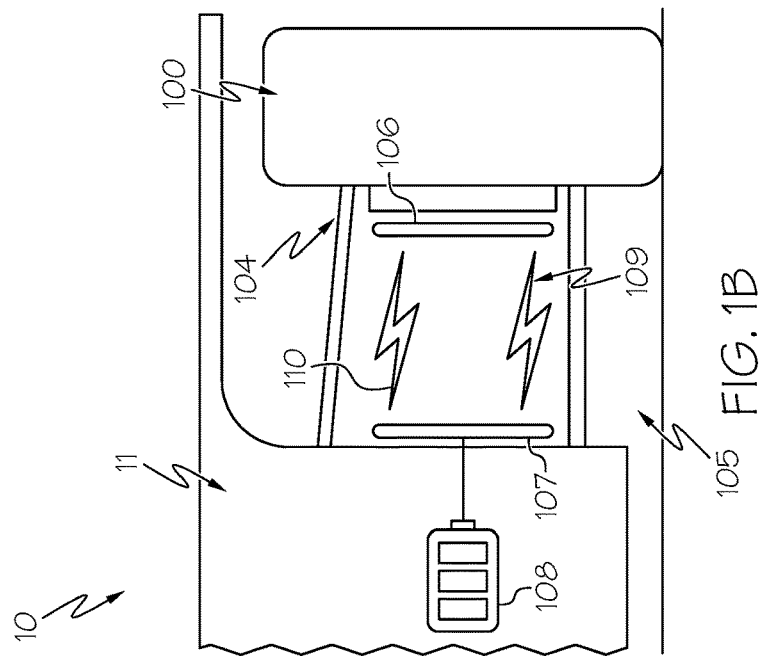
FIG. 1B schematically depicts the wireless energy transfer electronics system of the vehicle of FIG. 1A according to one or more embodiments shown and described herein.
Figure 1A:
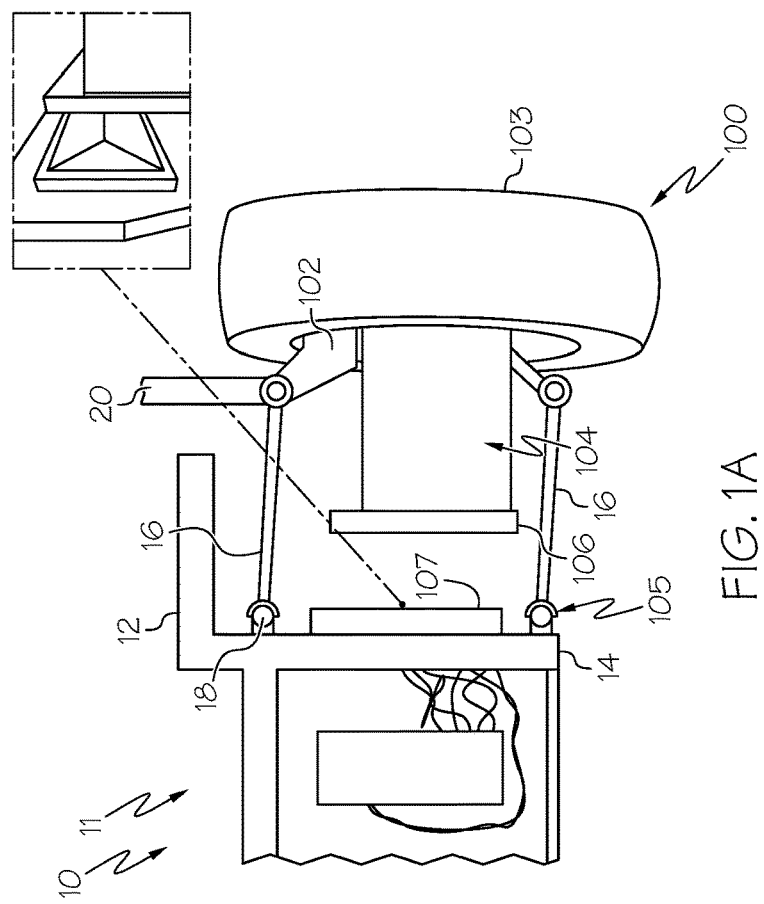
FIG. 1A schematically depicts a portion of a vehicle having an example wirelessly powered in-wheel motor assembly according to one or more embodiments shown and described herein.

Referring now to FIG. 1A, a portion of an example vehicle 10 is shown. The example vehicle 10 includes a main body 11 having a frame 12 and one or more wheels 104. Throughout this specification, the one or more wheels 104 may be referred to interchangeably in the singular as "the" wheel 104 or in the plural as "the one or more" wheels 104. Accordingly, the example vehicle 10 may include one or more wheels as described herein. The example vehicle 10 is mechanically and electrically coupled to the one or more wheels 104. The wheel 104 may be mechanically coupled to the suspension 14 of the frame 12 using one or more steering arms 16, one or more struts 18, one or more springs 20 or one or more other components for mechanically coupling a wheel to a vehicle. The steering arms 16 may be connected to the drive train (not shown) and may be coupled to the steering wheel (not shown) or other component to turn the wheels 104 to enable steering the example vehicle 10. The wheel 104 may include a steering knuckle 102 for coupling the steering arms 16, struts 18, one or more springs 20, or other components to the wheel 104 and enabling the wheel 104 to rotate relative to the example vehicle 10. The steering knuckle 102 may contain a wheel hub (not shown) or a spindle (not shown) and permit rotational motion of the wheel 104 relative to the example vehicle 10. The wheel 104 may be mechanically coupled to the frame 12 of the example vehicle 10 through one or more springs 20 for enabling relative motion between the wheel 104 and the example vehicle 10 in the vehicle-vertical direction. The wheel 104 may be fixed in the forward-rearward direction with respect to the example vehicle 10 by the attachments between the steering knuckle 102 and the steering arms 16, struts 18, and springs 20. In some embodiments, the wheel includes a tire 103. The tire 103 may include a tread for added traction and stability and may be generally formed from rubber or a synthetic rubber substance.

The wheel 104 is a component of a wireless in-wheel electric assembly 100 containing various parts and systems for powering a motor as will be described in greater detail below. In embodiments of the wheel 104, the entire wireless in-wheel electric assembly 100 is housed within the wheel 104 such that the wheel 104 is powered by a self-contained assembly. Additionally, one or more wheels 104 of the example vehicle 10 may include wireless energy transfer electronics systems 105 for wirelessly transferring energy between the example vehicle 10 and the wireless in-wheel electric assembly 100.

Referring now to FIG. 1B, the example vehicle 10 includes one or more batteries 108 in the main body 11. Throughout this specification, the one or more batteries 108 may be referred to interchangeably in the singular as "the" battery 108 or in the plural as "the one or more" batteries 108. The battery 108 is rechargeable and may provide electrical power in the form of direct current (DC) to one or more components of the example vehicle 10. The battery 108 may be a lead-acid battery, nickel metal hydride, a lithium-ion battery, or any other type of battery suitable for vehicle applications.

As shown in FIG. 1B, the battery 108 is electrically coupled to the transmitting coil 107 such that the battery provides electrical energy to the transmitting coil 107 of the wireless energy transfer electronics system 105. The transmitting coil 107 wirelessly transmits alternating current (AC) electrical energy to the receiving coil 106 of the wireless energy transfer electronics system 105 across an air gap 109 for powering the components of the wireless in-wheel electric assembly 100 as described in greater detail below. Various components of the wireless in-wheel electric assembly 100 convert electrical energy to mechanical energy for propelling the example vehicle 10.

As used herein, "wireless energy transmission" is the transmission of electrical energy from a power source or energy store, such as a battery, to an electrical load, such as a wireless in-wheel electric assembly 100, without the use of electrically conductive mediums such as wires or cables. The wireless energy transfer electronics system 105 may use time-varying electric, magnetic, or electromagnetic fields of electronic or electromagnetic waves. As shown by FIG. 1B, the transmitting coil 107 converts electrical energy to field energy 110 and transmits the field energy 110 across the air gap 109 such that the field energy 110 can be converted back into electrical energy by components in the wheel 104 to power the wheel 104.

The wireless energy transfer electronics system 105 may use near-field or far-field technology to transfer energy wirelessly. Any known or yet-to-be developed means for wireless energy transmission may be provided. As non-limiting examples, the wireless energy transfer electronics system 105 may use inductive coupling, resonant inductive coupling, capacitive coupling, magneto-dynamic coupling or some other means to transfer electrical energy across the air gap 109. The example vehicle 10 may be equipped with any number of transmitting coils 107 such that multiple locations on the example vehicle 10 can be used to wirelessly transmit electrical power to more than one wheel 104 at a time. In some embodiments, the example vehicle 10 is a four-wheeled vehicle and the example vehicle 10 has four transmitting coils 107 (for example, two front wheels, two rear wheels, as in a standard four-wheel vehicle) for transmitting electrical energy to four wireless in-wheel electric assemblies 100 for propelling the example vehicle 10 as described below; however, embodiments are not so limited. In other embodiments, the example vehicle 10 may have one or more wheels, such as in, for example, a motorcycle having two wheels with one or both having a wireless in-wheel electric assembly 100 or a tricycle in which one or more wheels include a wireless in-wheel electric assembly 100. Embodiments are contemplated in which all, none, or some of the wheels of the vehicle are wirelessly powered.

Figure 2:
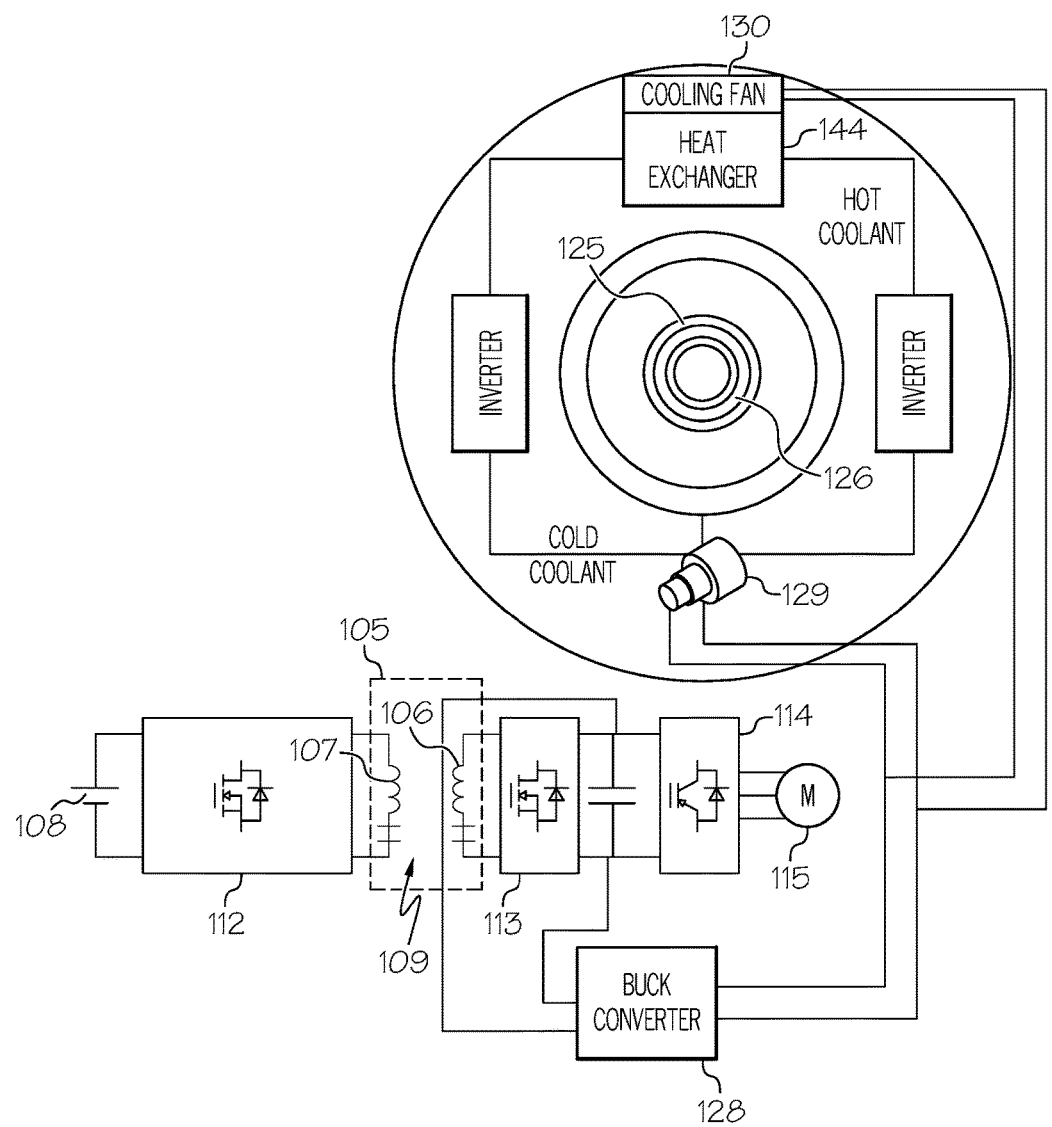
FIG. 2 schematically depicts components of the wirelessly powered in-wheel motor assembly of the vehicle of FIG. 1A according to one or more embodiments shown and described herein.

Referring now to FIG. 2, the wireless energy transfer electronics system 105 will be described in greater detail. The battery 108, housed in the main body 11 of the example vehicle 10, is electrically coupled to the one or more primary inverters 112. Throughout this specification, the one or more primary inverters 112 may be referred to interchangeably in the singular as "the" primary inverter 112 or in the plural as "the one or more" primary inverters 112. The battery 108 may be electrically coupled to the primary inverter 112 for inverting the direct current (DC) power from the battery 108 to AC power for transmission by the one or more transmitting coils 107. After the DC-AC conversion, the AC power may be transmitted from the transmitting coil 107 to the one or more receiving coils 106 of the wireless energy transfer electronics system 105. Throughout this specification, the one or more receiving coils 106 may be referred to interchangeably in the singular as "the" receiving coil 106 or in the plural as "the one or more" receiving coils 106. The battery 108 provides sufficient electrical power to the primary inverter 112 such that the transmitting coil 107 can transmit electrical energy across the air gap 109.

The receiving coil 106 receives the wirelessly transmitted electrical power across the air gap 109. The receiving coil 106 is electrically coupled to one or more secondary converters 113. Throughout this specification, the one or more secondary converters 113 may be referred to interchangeably in the singular as "the" secondary converter 113 or in the plural as "the one or more" secondary converters 113. The secondary converter 113 converts the AC power from the receiving coil 106 to DC power for conversion to AC power by one or more secondary inverters 114.

The secondary converter 113 is electrically coupled to the secondary inverters 114 operable to provide AC power to the wireless in-wheel electric assembly 100. In some embodiments, the secondary inverter 114 is configured as a pulse width modulation (PWM) circuit that controls the AC power delivered to the electric motor 115. The secondary inverter 114 may include one or more power electronics devices to switch the DC power to convert the DC power to AC power, such as, without limitation, inverter gate bipolar transistors (IGBT) and metal-oxide semiconductor field-effect transistor (MOSFET) devices.

Still referring to FIG. 2, some embodiments of the wireless in-wheel electric assembly 100 include one or more buck converters 128. The buck converter 128 may be electrically coupled to the secondary converter 113 for stepping down the voltage from secondary converter to an appropriate level for powering one or more auxiliary electronics of the wireless in-wheel electric assembly 100. For example, some embodiments of the wireless in-wheel electric assembly 100 may include a micro pump 129 for pumping coolant through various components of the wheel 104 for cooling the components. Such a micro pump 129 might require a different, in some embodiments a lower, voltage than the voltage supplied to the secondary inverter 114 by the secondary converters 113. Additionally, in some embodiments of the wheel 104, a fan 130 (also shown in FIG. 3) may be used to circulate air across one or more components. In such embodiments, the buck converter 128 may provide the auxiliary electronics with electric power at an appropriate voltage. The buck converter 128 may be electrically coupled to the one or more auxiliary electronics using electrically conductive wires, such as copper wires.

Figure 3:
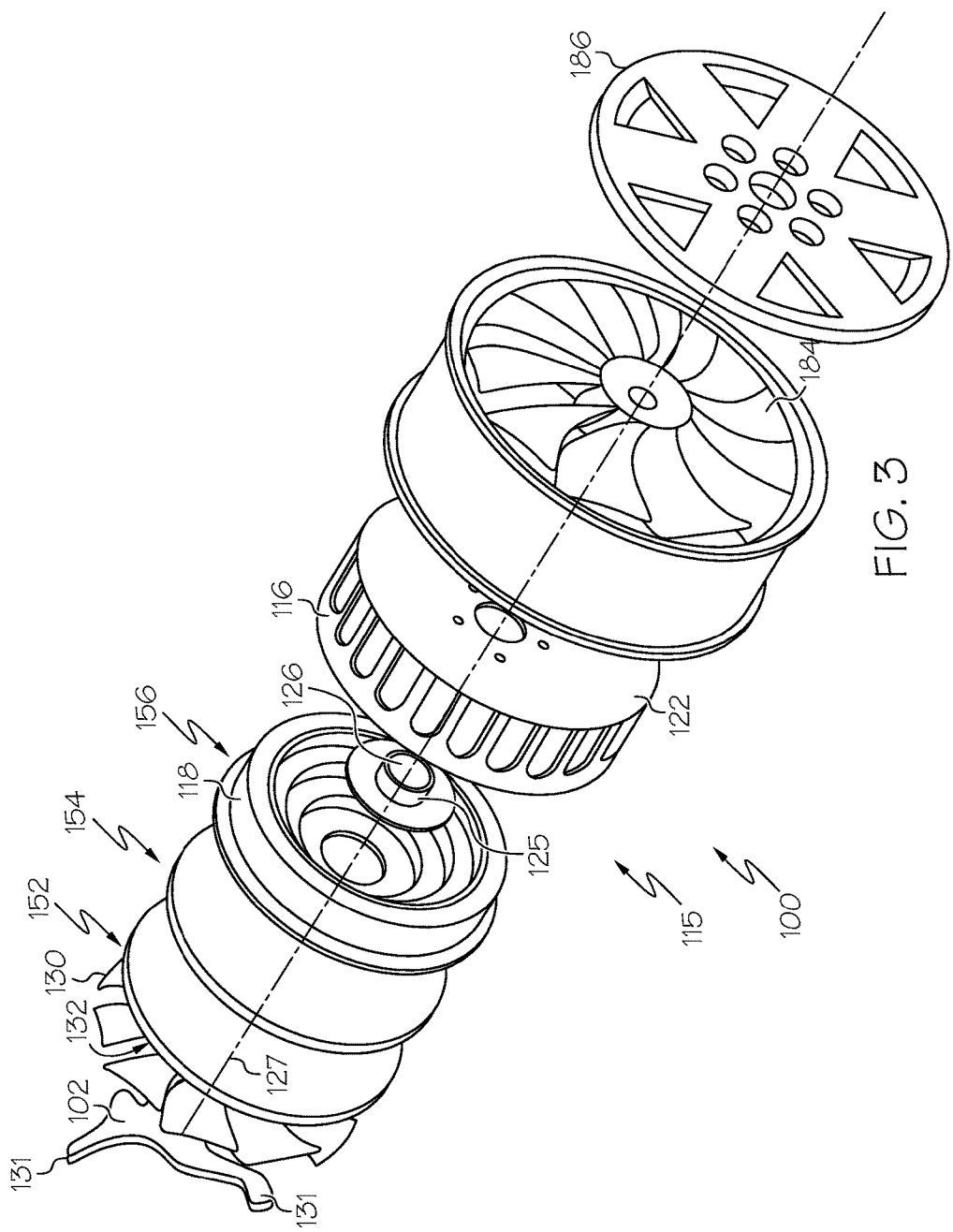
FIG. 3 schematically depicts an exploded view of an example wirelessly powered in-wheel motor assembly according to one or more embodiments shown and described herein.
Figure 4:
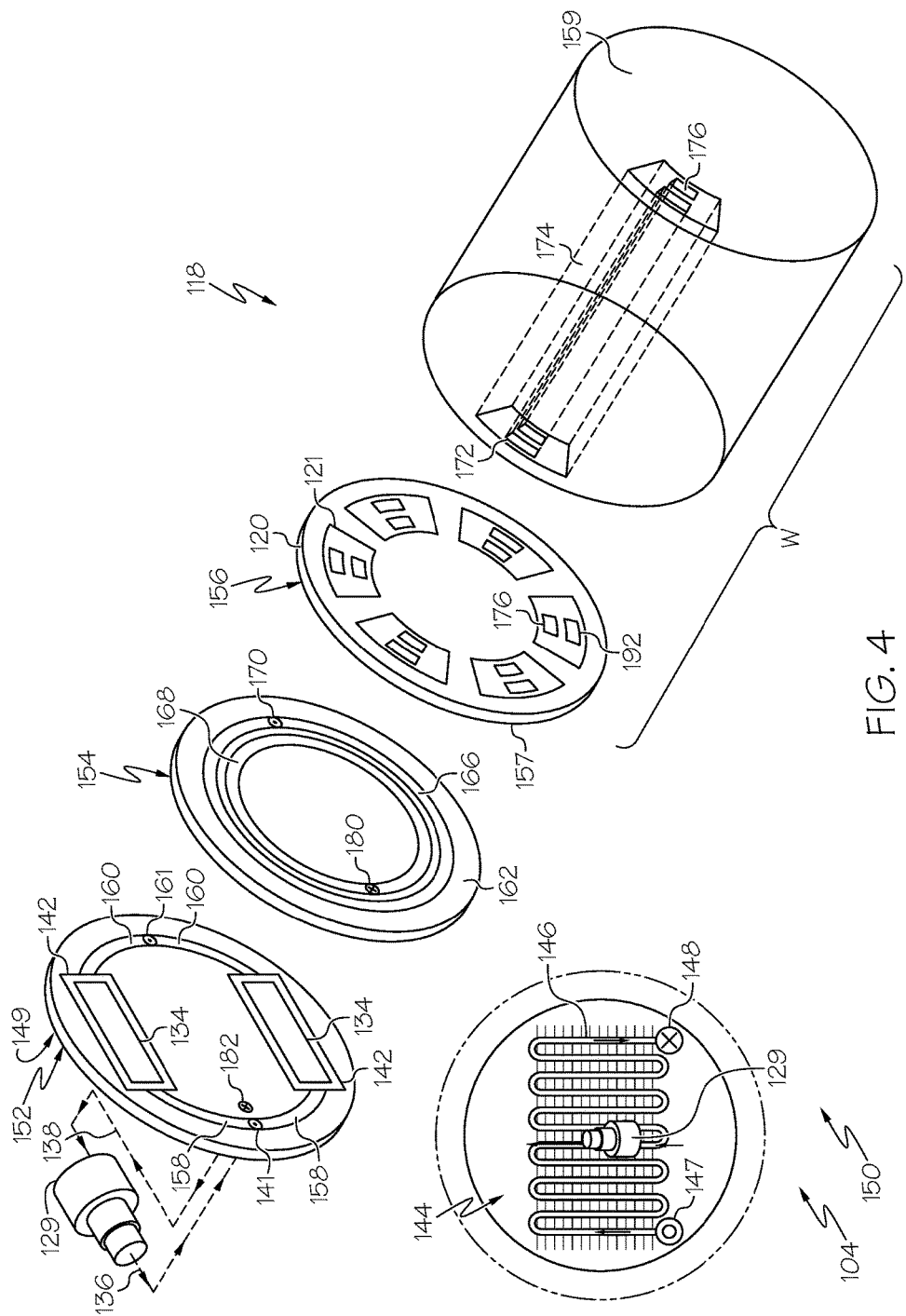
FIG. 4 schematically depicts an exploded view of an example cooling system of the example wirelessly powered in-wheel motor assembly of FIG. 3 according to one or more embodiments shown and described herein.

The electric motor 115 may be any type of AC or DC powered motor. In some embodiments, the wireless in-wheel electric assembly 100 is a three-phase, six-pole squirrel cage motor. Referring to FIG. 3, the electric motor 115 comprises a rotor 116 and a stator 118. In some embodiments, the rotor 116 surrounds the stator 118. In some embodiments, the stator 118 surrounds the rotor 116. As shown in FIG. 4, the stator 118 includes a stator body 120 and one or more stator poles 121 within the stator body 120. For the sake of clarity, only one stator pole 121 is depicted extending through the entire width W of the stator 118. Each stator pole 121 may comprise a ferrous or otherwise magnetically permeable material and a magnetic flux generating device, such as a stator coil, which may be wound around each stator pole 121. The stator body 120 need not have a circular outer cross-section (although some embodiments have such a cross section), but may be configured in any suitable arrangement for supporting the stator poles 121.

In the particular embodiment depicted, a single phase of the simulated, three-phase AC from the secondary inverter 114 is applied to two opposing stator poles 121. As will be appreciated by one skilled in the art, the each of the three-phases of current will rotatively peak in subsequent stator poles 121 to generate a rotating magnetic field. The rotating field will synchronously pull the associated rotor poles to create a torque on the rotor 116 which is mechanically coupled to the wheel 104 as described below.

Referring once again to FIG. 3, the rotor 116 of the electric motor 115 has a rotor body 122 supporting a plurality of rotor poles (not shown). In some embodiments, the number of rotor poles is equivalent to the number of stator poles 121 such that each rotor pole aligns with a stator pole 121 when the electric motor 115 is in operation. In embodiments in which the rotor 116 surrounds the stator 118, the rotor 116 is operable to rotate around the stator body 120, for example on appropriate energization of the stator poles 121 by the stator coils. The rotor 116 is mechanically coupled to the radially-outward race 125 of the bearing 126. The bearing 126 may be configured such that the radially-outward race 125 is rotatable about the axle of the wheel 104, schematically depicted by dashed line 127. In this manner, the rotor 116 is rotatably coupled to the axle of the wheel 104. The axle of the wheel 104 is rotationally (and otherwise) fixed with respect to the vehicle by the mechanical connections, such as the steering arms 16 discussed above. This permits rotational motion of the rotor 116, and in turn the wheel 104 and tire 103, relative to the example vehicle 10 and other components of the wireless in-wheel electric assembly 100.

As stated above, the wheel 104 may include a steering knuckle 102. The steering knuckle 102 may include one or more steering knuckle arms 131 for attaching the wheel 104 to the example vehicle 10. The steering knuckle arms 131 may mechanically couple to the springs 20, the steering arms 16, or the struts 18 as shown in FIG. 1A. Some embodiments of the steering knuckle 102 may include a central bore for allowing various components of the wireless in-wheel electric assembly 100 to pass through. For example, the receiving coil 106 may comprise an inward-facing face of a housing projecting through a central bore in the steering knuckle 102 between the steering knuckle 102 and the main body 11 of the example vehicle 10 as shown in FIG. 1A.

Referring to FIGS. 3 and 4, in some embodiments, the steering knuckle 102 is mechanically coupled at its outward-facing face to an electronics cover 132 for housing the various electrical components of the wireless in-wheel electric assembly 100 on a power electronics plate 152. Some embodiments may also include a fan 130 that rotates to force air through the wireless in-wheel electric assembly 100. The electronics cover 132 may protect the various electronics, such as the secondary converter 113, the secondary inverter 114, and other components, from moisture, mud, debris, dust, and other substances that may be damaging to electronic equipment that the components of the wheel 104 may be exposed to during use of the example vehicle 10 and be coupled to the power electronics plate 152. The power electronics plate 152 may comprise one or more power electronics boards 134, as shown in FIG. 4, comprising one or more printed circuit boards (PCBs) and/or other various electronic equipment to carry out the various functions described herein, as will be appreciated by one skilled in the art. Some embodiments of the wireless in-wheel electric assembly 100 may include a manifold plate 154. The manifold plate 154 may be positioned between the stator plate 156 and the power electronics plate 152 for providing coolant to the stator 118 and/or the power electronics boards 134.

Referring to FIG. 4, a cooling system 150 of the wireless in-wheel electric assembly 100 will now be described. The example cooling system 150 may include cooling plates such as the power electronics plate 152, the manifold plate 154, and the stator plate 156. In some embodiments, features of the power electronics plate 152, the manifold plate 154, and the stator plate 156 are fluidly coupled by various cooling lines, such as plastic or rubber pipes, as a non-limiting example, for pumping coolant to the various components on the plates using one or more micro pumps 129, as discussed above. In some embodiments, the various cooling plates are directly fluidly and mechanically coupled without the use of pipes or other components besides the fluid lines on the plate.

The micro pump 129 may be any type of pump sufficient to move coolant through the various lines and channels of the cooling system 150. As a non-limiting example, the micro pump 129 may be a reciprocating pump, such as a gear, lobe, screw, vane, or regenerative pump. As an additional non-limiting example, the micro pump 129 may be a positive displacement pump, such as a piston pump. The micro pump 129 has at least one inlet and at least one outlet and creates a positive pressure differential across the at least one inlet and at least one outlet such that the pressure is higher at the outlet of the pump. The outlet of the pump is the supply for the other components of the cooling system 150. The micro pump 129 is small enough to house completely within the wireless in-wheel electric assembly 100. As described above, the micro pump 129 may be electrically powered through the buck converter 128 or some other means.

Additionally, the cooling system 150 may include one or more radiators 144 for rejecting the heat generated by the components and absorbed by the coolant as it flows through or near the heat-generating components. Such heat may be exhausted to the environment or to one or more external cooling systems. In one embodiment, the radiator 144 is mounted on the inward-facing face 149 of the power electronics plate 152. As used herein, the terms "inward-facing" and "outward-facing" (or simply "inward" or "outward" or "inner" or "outer") recognize a general symmetry used in most vehicles about a vehicle centerline (or axis) and thus refer to the vehicle-inward or -outward direction with reference to a centerline of the vehicle. The radiator may take any shape on the surface of the power electronics plate 152, such as, for example, a ring or a strip along the surface of the plate. As shown in FIG. 4, the radiator 144 may be fluidly coupled to the plates by a supply header 136 and a return header 138. The supply header 136 may deliver cooled coolant having been cooled by the radiator 144 to the various components, such as the heat generating components and the electric motor 115. In turn, the return header 138 may return the heated coolant from the components.

The various plates of the cooling system 150 distribute the coolant to the heat-generating components of the wireless in-wheel electric assembly 100 such as the stator poles 121 and the power electronics circuitry described above. In the example embodiment shown, the wireless in-wheel electric assembly 100 includes three plates, a power electronics plate 152, a manifold plate 154, and a stator plate 156, but embodiments are not so limited. The stator plate 156, for example, may be an integral portion of the stator body 120. Other embodiments may include different manifolds for delivering fluid between the stator 118 and the radiator 144. The various plates may be made from any suitable material, such as metal or plastic. The material may generally be selected based upon durability and the ability to dissipate heat from the heat generating components. For example, the material comprising the stator plate 156 may be selected based upon its ability to conduct heat away from the stator poles 121. The various plates may be coupled using any suitable means, such as, for example, soldering, welding, glue, screws, or any other suitable means.

Still referring to FIG. 4, in some embodiments the power electronics plate 152 includes a supply port 141. The supply port 141 of the power electronics plate 152 is fluidly coupled to the radiator 144 coolant outlet 148, schematically depicted by the inset of FIG. 4. The supply port 141 is coupled to one or more supply channels 158 on the power electronics plate 152. The supply channels 158 are fluidly coupled to one or more cold plates 142, which are described in greater detail below. The cold plates 142 are thermally coupled to the one or more power electronics boards 134. The cold plates 142 may remove heat from the heat-generating components of the power electronics boards 134, such as the secondary inverter 114, to cool the heat-generating components as described below. The power electronics plate 152 also includes power electronics exhaust lines 160. The power electronics exhaust lines 160 meet at opening 161.

Opening 161 in the power electronics plate 152 is fluidly coupled to the opening 170 in the manifold plate 154. In some embodiments, an outward-facing face 162 of the manifold plate 154 may be mechanically and fluidly coupled to an inward-facing face 157 of the stator plate 156. In such embodiments, the outward-facing face 162 of the manifold plate 154 comprises an outer channel 166 and an inner channel 168. The outer channel 166 is mechanically and fluidly coupled to one or more supply channels 172 that pass through the stator poles 121. The outer channel 166 may have the same radius with respect to the central axle as the supply channel 172 and pass through one or more stator irons 174 such that fluid flowing through the outer channel 166 is directed through the supply channels 172 to flow through the stator irons 174 and remove heat from the stator irons 174. Each stator iron 174 may pass through the width W of the stator plate 156. The stator irons 174 may further comprise a return channel 176 for returning the coolant back through the stator iron 174. The supply channels 172 and the return channels 176 may be fluidly coupled at the outward-facing face 159 of the stator plate 156. The outward-facing face 159 of the stator plate 156 may comprise a fluid coupling mechanism for redirecting coolant flowing through the supply channel 172 to the return channel 176 such as a tube or a capping plate (not shown). Any positive pressure gradient then, between the supply channel 172 and the return channel 176 will cause coolant to flow through supply channel 172 to the return channel 176 and back to the return header 138 via the fluid coupling mechanism.

Particularly, coolant redirected at the outward-facing face 159 of the stator plate 156 returns to the inner channel 168 through the return channel 176 through the stator iron 174. The inner channel 168 includes an opening 180 for coupling the inner channel 168 to the return header 138 for returning heated coolant to the radiator 144. The return header 138 may comprise an opening 182 through the power electronics plate 152 for return to the radiator 144.

Figure 5A:
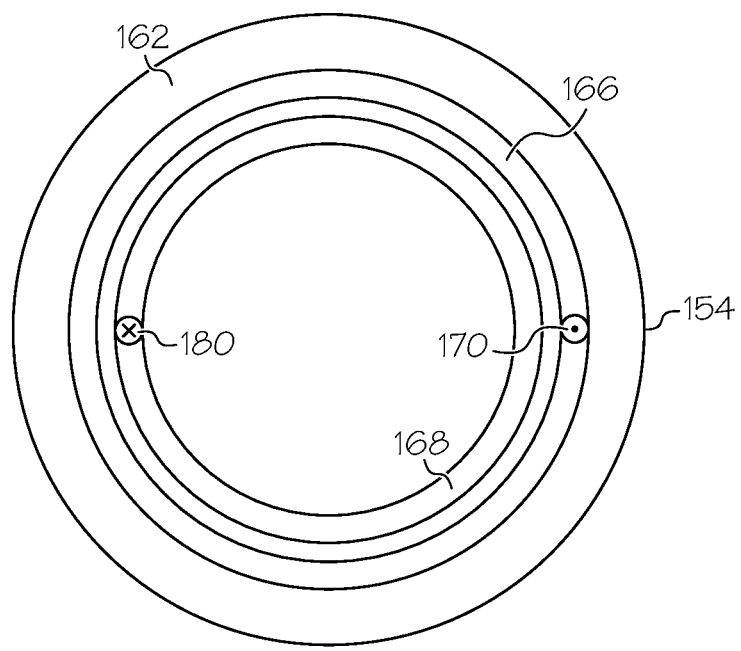
FIG. 5A schematically depicts a top view of example cooling channels of the manifold plate of the cooling system of FIG. 4 according to one or more embodiments shown and described herein.

FIG. 5A depicts the outward-facing face 162 of the manifold plate 154 in greater detail. In some embodiments, the outward-facing face 162 of the manifold plate 154 includes a pair of concentric channels including an inner channel 168 and an outer channel 166 as described above. The channels may be formed with grooves or other feature for encouraging the flow of coolant through the channels. The opening 170 fluidly connects to the inner channel 168 to allow fluid to enter the inner channel 168. The inner channel 168 is fluidly coupled to the inlet of the supply channel 172 (FIG. 4). The fluid coupling may include a gasket, an o-ring, or some other way to seal the fluid channel. Similarly, the inner channel 168 is fluidly coupled with the return channel 176 (FIG. 4) and a gasket or o-ring may seal the fluid coupling to prevent coolant from leaking.

Figure 5B:
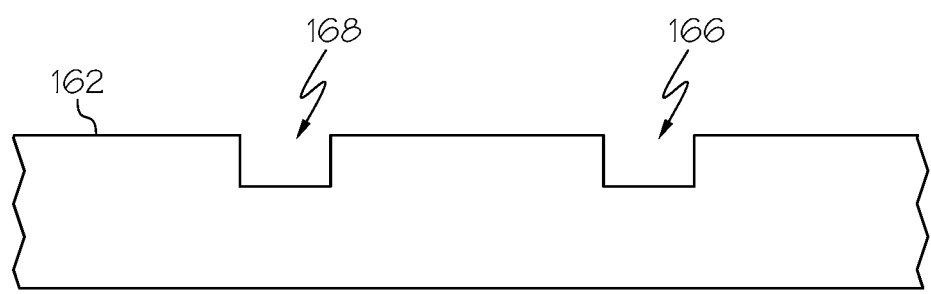
FIG. 5B schematically depicts a side of example cooling channels of the manifold plate of the cooling system of FIG. 4 according to one or more embodiments shown and described herein.

FIG. 5B depicts a side view of the inner channel 168 and the outer channel 166. The channels may comprise slots or channels cut from the surface of the manifold plate 154. In some embodiments, the channels are cut using a vertical mill or a lathe directly into the surface of the plate. In other embodiments, the channels may comprise raised surfaces formed on the surface of the plate. In some embodiments, the channels may comprise tubes between the manifold plate 154 and the stator plate 156 with appropriate fluid couplings between the various supply channels 172, return channels 176, and the channels on the manifold plate 154. The supply channels 158 and power electronics exhaust lines 160 on the power electronics plate 152 may be similarly formed.

As shown in the inset of FIG. 4, the radiator 144 may generally comprise a heat exchanger with the ultimate heat sink the environment, such as the ambient air, or some other cooling system. Some embodiments of the present disclosure include cross flow heat exchangers where hot coolant is passed through one or more cooling channels 146 that are in contact with the air or some other cooling medium such that heat is passed to the air as the coolant passes through the channels. The plurality of cooling channels 146 may cross a vehicle-inward face of the electronics cover 132. The cooling channels 146 may be fluidly coupled with the supply header 136 and the return header 138 through a radiator coolant inlet 147 and a radiator coolant outlet 148. In some embodiments, the inward-facing face 149 of the electronics cover 132 may comprise fins, or be crafted from a thermally conductive material such as copper, tin, or some other metal such as to conduct heat from the coolant flowing through the cooling channels 146 to the air as the wheel 104 turns or as the fan 130 blows. In some embodiments, the housing of the wireless in-wheel electric assembly 100 or other parts of the wheel 104 are vented to the atmosphere to allow air to flow through the housing of the wheel 104 for better circulation. In some embodiments, air is forced through the wheel 104 by components such as the fan-shaped hubcap insert 184.

As stated above, in some embodiments, the wireless in-wheel electric assembly 100 includes a fan. The fan 130 may be powered by the buck converter 128 or some other component producing sufficient voltage housed in the wheel 104. As also stated above, the fan 130 may be configured to force air across the cooling channels of the radiator 144 even when the wheel 104 is not spinning such that components of the wheel 104 can be cooled even if the wheel 104 is not turning or is turning at a low rate, such as when the speed of the example vehicle 10 is low, but the power output (and thus the cooling load) is high due to a heavy load on the various wireless in-wheel electric assemblies 100 of the example vehicle 10.

As shown in FIG. 3, some embodiments of the present disclosure include a fan-shaped hubcap insert 184 for forcing air into the wheel 104 or across the radiator 144. In such embodiments, air flow over the radiator 144 may be forced as the wheel 104 turns to move the example vehicle 10. Embodiments may include a fan-shaped hubcap insert 184 that is geared using a number or set of gears such that the fan-shaped hubcap insert 184 spins at a faster rotational velocity than the wheel 104 to increase the amount of cooling to the components when the wheel 104 is spinning at a relatively low speed. Various embodiments of the wheel 104 may include fan-shaped hubcap inserts 184 that are designed to spin regardless of whether the wheel 104 is turning or not such that air may be forced across the radiator 144 even when the wheel 104 is not spinning. The fan 130 may work in tandem with the fan-shaped hubcap insert 184 to force air across the cooling coils such that heat is withdrawn from the coolant. Additionally, power may be cycled to the fan 130 based upon whether the fan-shaped hubcap insert 184 is rotating. Embodiments may further include a hubcap 186.

In operation, the driver of a vehicle orders a specific power level to be applied to wheels 104 of the example vehicle 10. The power level may be ordered using a pedal or some other means such as a voice instruction or some other means. Additionally, the example vehicle 10 may be autonomous or semi-autonomous such that the power level is automatically ordered. Once the power level is ordered, the battery 108 supplies the appropriate amount of electrical power to the primary inverter 112 to achieve the desired output power. The desired output power may correspond to a vehicle speed, such as 70 mph or a particular horsepower, or some other method of measuring the output of a vehicle such as a towing capacity or the like.

The primary inverter changes the DC signal from the battery to an AC signal for transmission from the transmitting coil 107 to the receiving coil 106 across the air gap 109. The signal is transmitted as field energy 110 across the air gap 109 and received by the receiving coil 106. The receiving coil 106 is coupled to the secondary converter 113 which converts the electrical energy back to a DC signal for use in the secondary inverter 114. As described above, the secondary inverter 114 modulates the DC signal to simulated AC to control power to the wireless in-wheel electric assembly 100.

The secondary inverter 114 supplies simulated AC power to the stator windings to generate a magnetic field. In some embodiments, the field is a six-pole field. As will be appreciated by those skilled in the art, the magnetic field applies a torque to the fixed magnets of the rotor 116. In embodiments in which the rotor 116 surrounds the stator 118, the rotor is mechanically coupled to the wheel 104 such that as the rotor 116 spins, the wheel 104 will also spin. As the vehicle is propelled forward, the components, such as the receiving coil 106, the primary inverter 112, the secondary converter 113, the secondary inverter 114, the rotor 116, and the stator 118 of the electric motor 115 will generate heat. The cooling system 150 supplies coolant to the components such as the receiving coil 106, the primary inverter 112, the secondary converter 113, the secondary inverter 114, the rotor 116, and the stator 118. Referring to the example embodiment depicted in FIG. 4, the coolant first enters the supply header 136. The supply header 136 is fluidly coupled with supply channels 158 through supply port 141. Thus, coolant flows to the cold plates 142 through the supply channels 158 and out of the cold plates 142 through the exhaust lines 160 after cooling the heat generating device on the power electronics board 134 (e.g., electronic components defining the secondary converter 113 and the secondary inverter 114.

The exhaust lines 160 are fluidly coupled with the outer channel 166 of the manifold plate 154 through the opening 170. Thus, the coolant flows to the outer channel 166 through the opening 170. The outer channel 166 is also fluidly coupled to the supply channels 172 through the stator irons 174 so coolant flows along the width W of the stator iron 174. The coolant flows out of the supply channel 172 to the return channel 176 through a redirection feature (not shown). The coolant then flows out of the stator iron 174 through the return channel 176, which is fluidly coupled with the inner channel 168 on the manifold plate 154. The manifold plate is fluidly coupled with the return header 138 through openings 180 in the inner channel 168 of the manifold plate and the opening 182 through the power electronics plate 152. Thus, coolant will flow through the return header 138 to the suction of the micro pump 129. And such example flow may repeat itself as necessary for the cooling of the wireless in-wheel electric assembly 100.

In the example embodiment described above, the fluid lines of the cooling system 150 are arranged in series. But it should be understood that various embodiments of the wireless in-wheel electric assembly 100 include a cooling system 150 that is arranged such that components are cooled in parallel, such as, in one example, if the coolant were to flow to the stator and the cold plates in parallel after leaving the discharge of the coolant pump.

It should now be understood that embodiments of the present disclosure provide wireless in-wheel electric motor assemblies incorporating an integrated cooling system for electric vehicles. The wireless in-wheel electric motor assemblies described herein remove the need for fluid coupling lines between a body of a vehicle and the wireless in-wheel electric motor. Accordingly, the wireless in-wheel electric motor assemblies described herein may be more reliable than existing in-wheel electric motors because fluid coupling lines are no longer required in the harsh operating environment between the body of the vehicle and the wireless in- wheel electric motor.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wireless in-wheel electric motor assembly comprising:
   a wheel;
   an electric motor disposed within the wheel, the electric motor comprising a stator and a rotor;
   a receiving coil operable to receive wirelessly transmitted energy, wherein the receiving coil is disposed within the wheel;
   a first conversion circuit electrically coupled to the receiving coil and operable to convert the wirelessly transmitted energy from the receiving coil into direct current, wherein the first conversion circuit is disposed within the wheel;
   an inverter circuit electrically coupled to the first conversion circuit and the electric motor, wherein the inverter circuit is operable to power the electric motor and is disposed within the wheel; and
   a cooling system disposed within the wheel, the cooling system comprising:
      a micro pump operable to pump coolant;
      a fluid line operable to pass the coolant proximate at least one of the first conversion circuit and the inverter circuit; and
      a heat exchanger operable to receive heated coolant and dissipate heat to an environment.

2. The wireless in-wheel electric motor assembly of claim 1, further comprising a second conversion circuit electrically coupled to the first conversion circuit and the micro pump, wherein the second conversion circuit is operable to power the micro pump and is disposed within the housing.

3. The wireless in-wheel electric motor assembly of claim 1, further comprising a fan configured to force air to flow across the heat exchanger.

4. The wireless in-wheel electric motor assembly of claim 3, wherein the fan is selectively powered based on at least one of a rotational velocity of the wheel, a temperature of the coolant, a temperature of the electrical components of the system, an electrical output of the motor, and a mechanical output of the motor.

5. The wireless in-wheel electric motor assembly of claim 1, further comprising a hubcap having a fan blade shape such that rotation of the hubcap forces air across one or more of the heat exchangers to convect heat out of the coolant.

6. The wireless in-wheel electric motor assembly of claim 1, wherein the cooling system supplies coolant to a stator of the in-wheel electric assembly to cool the stator.

7. The wireless in-wheel electric motor assembly of claim 1, wherein the cooling system further comprises a manifold plate comprising an inner face and an outer face, the outer face including a pair of concentric cooling channels including an outer channel and an inner channel.

8. The wireless in-wheel electric motor assembly of claim 7, wherein the pair of concentric cooling channels are fluidly coupled to one or more coolant supply channels and one or more coolant return channels through one or more stator irons of the stator within the wheel through a pair of openings in the manifold plate.

9. The wireless in-wheel electric motor assembly of claim 8, wherein
   each of the one or more stator irons comprises the coolant supply channel and the coolant return channel passing through a width of the stator iron; and
   the coolant supply channel and the coolant return channel are coradial with the outer channel and the inner channel of the outer face of the manifold plate, are fluidly coupled thereto, and the individual coolant supply and coolant return channels are fluidly coupled by a redirection feature at the end of the coolant supply and the coolant return channels opposite the manifold plate.

10. A vehicle comprising:
one or more batteries;
a transmitting coil electrically coupled to the one or more batteries and operable to transmit wirelessly transmitted energy; and
a wireless in-wheel electric motor assembly comprising:
   a wheel;
   an electric motor disposed within the wheel, the electric motor comprising a stator and a rotor;
   a receiving coil operable to receive wirelessly transmitted energy from the transmitting coil;
   a first conversion circuit electrically coupled to the receiving coil and operable to convert the wirelessly transmitted energy from the receiving coil into direct current, wherein the first conversion circuit is disposed within the wheel;
   an inverter circuit electrically coupled to the first conversion circuit and the electric motor, wherein the inverter circuit is operable to power the electric motor and is disposed within the wheel; and
   a cooling system comprising:
      a micro pump operable to pump coolant;
      a fluid line operable to pass the coolant proximate at least one of the first conversion circuit and the inverter circuit; and
      a heat exchanger operable to receive heated coolant and dissipate heat to an environment.

11. The vehicle of claim 10, wherein the wireless in-wheel electric motor assembly further comprises a second conversion circuit electrically coupled to the first conversion circuit and the micro pump, wherein the second conversion circuit is operable to power the micro pump and is disposed within the housing.

12. The vehicle of claim 10, wherein the wireless in-wheel electric motor assembly further comprises a fan configured to force air to flow across the heat exchanger.

13. The vehicle of claim 12, wherein the fan is selectively powered based on at least one of a rotational velocity of the one or more wheels, a temperature of the coolant, a temperature of the electrical components of the system, an electrical output of the motor, and a mechanical output of the motor.

14. The vehicle of claim 10, wherein the wheel further comprises a hubcap having a fan blade shape such that rotation of the hubcap forces air across one or more of the heat exchangers to convect heat out of the coolant.

15. The vehicle of claim 10, wherein the cooling system supplies coolant to one or more stators of the one or more in-wheel motor assemblies to cool the one or more stators.

16. The vehicle of claim 10, wherein the cooling system further comprises a manifold plate having an inner face and an outer face, the outer face comprising concentric cooling channels that are fluidly coupled to one or more coolant supply channels and one or more coolant return channels through one or more stator irons of the stator, wherein the concentric cooling channels are configured to supply coolant to the one or more coolant supply channels of the stator and receive heated coolant from the one or more coolant return channels of the stator.

17. The vehicle of claim 16, wherein the one or more coolant supply channels and the one or more coolant return channels are fluidly coupled by a redirection feature at an outer end of the coolant supply and the coolant return channels that is opposite the manifold plate.

18. The vehicle of claim 17, wherein the coolant supply channels and the coolant return channels form parallel channels within the one or more stator irons.

19. The vehicle of claim 10, further comprising a power electronics plate, wherein at least the first converter and the inverter circuit are supported by the power electronic plate, and the cooling system comprises cooling lines that fluidly couple the first converter and the inverter circuit with the radiator.

20. The vehicle of claim 19, further comprising a manifold plate having an inner face and an outer face, the outer face including concentric cooling channels that are fluidly coupled to the cooling system and configured to supply coolant to the stator and receive heated coolant from the stator, wherein the cooling lines of the power electronics plate and the cooling channels of the manifold plate are configured in series, such that coolant flows through the cooling lines before flowing through the cooling channels.

* * * * *